United States Patent Office
3,551,478
Patented Dec. 29, 1970

1

3,551,478
BASIC PHENOXY ACETAMIDES
Josef Schmitt, L'Hay-les-Roses, and Roger Raveux and Marcel Daniel Pierre Brunaud, Paris, France, assignors to Etablissements Clin-Byla, Paris, France, a French body corporate
No Drawing. Filed Dec. 4, 1967, Ser. No. 687,484
Claims priority, application France, Dec. 7, 1966, 86,463
Int. Cl. C07c $103/22$
U.S. Cl. 260—472        6 Claims

ABSTRACT OF THE DISCLOSURE

The dialkylaminoalkyl esters of para(phenoxyacetamido)benzoic acids corresponding to the formula

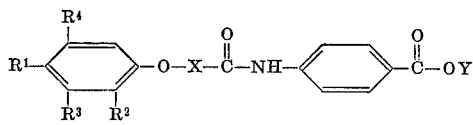

in which $R^1$ is a hydrogen or halogen atom or a lower alkyl, lower alkenyl, phenyl, phenylalkyl, hydroxyl, alkoxy, alkenoxy, cycloalkoxy, phenylalkoxy, acyl, nitro, amino or sulphamyl group, $R^2$ is a hydrogen or halogen atom or a lower alkyl, phenyl, phenylalkyl, alkoxy or lower acyl group, $R^3$ is a hydrogen atom, a lower alkyl, trifluoromethyl or alkoxy group, $R^4$ is a hydrogen atom or an alkyl group, X is a methylene group which may be substituted by one or two alkyl groups or by a phenyl group and Y is a group having the formula

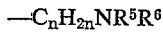

in which $n$ is 2 or 3 and each of $R^5$ and $R^6$ is a lower alkyl group or $R^5$ and $R^6$ taken together with the nitrogen atom to which they are attached form a heterocyclic group which may contain a nuclear oxygen atom, provided that when $R^1$ is a halogen atom and $R^2$ is a hydrogen atom the methylene group X has less than two substituents, and the addition salts of such esters with acids, are provided. The esters are used in the treatment of pathological states relating to lipid metabolism.

This invention relates to para(phenoxyacetamido)-benzoic acid esters of dialkylaminoalkanols which may contain substituents in the phenoxy group and to a process for the preparation thereof.

It is known that diethylaminoethyl para-aminobenzoate has the property of stimulating cellular respiration (A. Aslan, Arzneimittelforschung 1958, page 11). It is also known that this activity can be increased by combining the free amine group with nicotinic acid to form an amide function (K/L Zirm and A. Pongratz, Arzneimittelforschung 1960, page 412).

2

It is also known that certain derivatives of phenoxyacetic acids have an important effect on the lipid metabolism of man.

The present invention has been conceived with a view to providing compounds which have within their structure the characteristics of the diethylaminoethyl para-amino-benzoate molecule and of the phenoxyacetic acids and which also have a favourable action on cellular respiration, tissue respiration and lipid metabolism.

In accordance with the present invention there is provided a para(phenoxyacetamido)benzoic acid ester of a dialkylaminoalkanol having the general formula

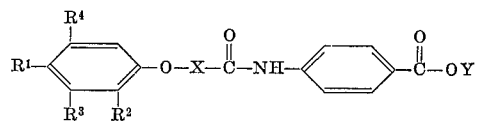

in which $R^1$ is a hydrogen or halogen atom or a lower alkyl, lower alkenyl, phenyl, phenylalkyl, hydroxyl, alkoxy, alkenoxy, cycloalkoxy, phenylalkoxy, acyl, nitro, amino or sulphamyl group, $R^2$ is a hydrogen or halogen atom or a lower alkyl, phenyl, phenylalkyl, alkoxy or lower acyl group, $R^3$ is a hydrogen atom, a lower alkyl, trifluoromethyl or alkoxy group, $R^4$ is a hydrogen atom or an alkyl group, X is a methylene group which may be substituted by one or two alkyl groups or by a phenyl group and Y is a group having the formula

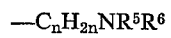

in which $n$ is 2 or 3 and each of $R^5$ and $R^6$ is a lower alkyl group or $R^5$ and $R^6$ taken together with the nitrogen atom to which they are attached form a heterocyclic group which may contain a nuclear oxygen atom, provided that when $R^1$ is a halogen atom and $R^2$ is hydrogen the group X has not more than one substituent, and the addition salts of such esters with acids.

The present invention also provides a process for the preparation of the hydrohalides of a para(phenoxyacetamido)benzoic acid ester of a dialkylaminoalkanol having the general formula

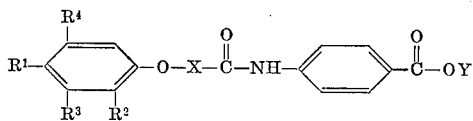

in which $R^1$, $R^2$, $R^3$, $R^4$ and Y are as above defined, which comprises reacting a para-aminobenzoic acid ester having the general formula

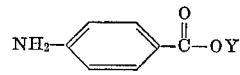

in which Y is as above defined, with a phenoxyacyl halide having the general formula

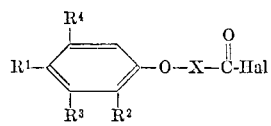

in which $R^1$, $R^2$, $R^3$, $R^4$ and X are as above defined and Hal is a halogen atom.

The acid chlorides used as starting materials in this process may be prepared by a conventional method, in particular by the action of thionyl chloride upon a suitable acid in an inert solvent such as benzene; they are isolated by distillation and are used as such.

The acids from which the acid chlorides mentioned above are obtained may be prepared by the condensation of phenols having the substituents $R^1$, $R^2$, $R^3$ and $R^4$ either (a) with an alkyl ester, more especialy a lower alkyl ester of α-bromoacetic, α-bromobutyric, α-bromoisobutyric, α-bromopropionic, α-bromoisovaleric or α-bromophenylacetic acid, the ester obtained by the condensation being saponified in a separate step to yield the corresponding acid; or (b) when X is the divalent group —$C(CH_3)_2$—, with acetone and chloroform in the presence of powdered soda.

A number of the acid starting materials prepared in this way are not recorded in the chemical literature; they are set out in Table I below; $M.P._K$ indicates the melting point measured on the Kofler bench and $M.P._c$ indicates the melting point measured in a capillary tube without correction.

TABLE I

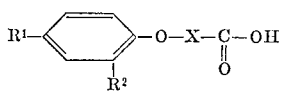

| $R^1$ | $R^2$ | X | Melting point and crystallisation solvent, °C. | Letter of identification |
|---|---|---|---|---|
| Cl | Cl | $CH(C_6H_5)$ | $M.P._K$ 136–137° (benzene) | A |
| Isopropoxy | H | $C(CH_3)_2$ | $M.P._K$ 57° (light petroleum) | B |
| n-Butoxy | H | $C(CH_3)_2$ | $M.P._K$ 76° (light petroleum) | C |
| n-Pentyloxy | H | $CH_2$ | $M.P._c$ 115° (diisopropyl ether) | D |
| Do | H | $CH(C_2H_5)$ | $M.P._c$ 58° (light petroleum) | E |
| Do | H | $C(CH_3)_2$ | $M.P._c$ 73° (light petroleum) | F |
| nHexyloxy | H | $CH_2$ | $M.P._c$ 114° (benzene) | G |
| Cyclopentyloxy | H | $C(CH_3)_2$ | $M.P._K$ 100° (diisopropyl ether) | H |
| Benzyloxy | H | $C(CH_3)_2$ | $M.P._K$ 3 17° (diisopropyl ether) | I |

The reaction of the acid chlorides with the amino esters and in particular with 2-diethylaminoethyl para-aminobenzoate is preferably carried out in an anhydrous diluent which is inert to the compounds used, for example a hydrocarbon such as benzene or better still a ketone such as acetone, at a temperature which may vary from room temperature to the boiling point of the diluent. The corresponding amide is obtained in the form of its hydrochloride which in many cases crystallises out directly. If this is not the case, it is advantageous for the purpose of preparing a crystalline salt to decompose the hydrochloride in aqueous solution with an alkaline agent such as sodium carbonate, extract the base liberated with a suitable solvent such as diethyl ether or ethyl acetate, evaporate the solvent and treat the residue with a suitable mineral or organic acid such as hydrochloric acid, fumaric acid or oxalic acid in equimolecular quantity. The salts may be purified by recrystallization. The corresponding bases have been obtained in the crystalline state in a large number of cases.

To prepare the 4-(para-amino-phenoxyacetylamino) benzoates of the dialkylaminoalkanols, especially of 2-diethylaminoethanol or compound 4415 CB, it is preferred to reduce the corresponding nitro compound by one of the conventional methods to the amino compound, for example using iron, zinc or tin in an acid medium or using stannous chloride or in the presence of a catalyst (in particular palladium carbon) in a solvent such as ethyl alcohol.

The products shown in Table II hereinafter have been prepared in the form of salts and bases. They have been fully identified by elementary analysis and infra-red spectography with a "Unicam S.P. 200" instrument.

In solution in methylene chloride, the bases show, among others, a band at 3400 cm.$^{-1}$ (N—H), a wide, intense band around 1700 cm.$^{-1}$ (merged bands of amide I and ester), a double band in the region of 1600 cm.$^{-1}$ and the amide II band in the region of 1530 cm.$^{-1}$. The salts in some cases have certain additional features; thus it has been found that the hydrochloride of the compound of Example 2 (compound 2842 CB) can exist in two isomeric crystalline forms of identical melting point (the same as their mixture), the formation of which is related to the crystallisation time. The crystalline forms are distinguished by their infra-red spectra (in potassium bromide): Among other things, as regards the C=O bond, one of the forms (No. 1) has a wide band around 1710 cm.$^{-1}$ whereas the second form has two distinct bands, one around 1710 cm.$^{-1}$ and the other around 1680 cm.$^{-1}$. One can pass from one to the other form according to whether separation of the crystalline product from its mother liquor is carried out rapidly (first form) or slowly (second form).

The observations made on one and the other of the two forms of compound 2842 CB or their mixture concerning the C=O bands apply similarly to the other hydrochlorides.

The fumarates and oxalates have, among other things, a more or less wide and often complex band between 1680 and 1700 cm.$^{-1}$.

In the following preparations and examples, the melting points are determined either upon the Kofler bench ($M.P._K$) or in a capillary tube and are uncorrected ($M.P._c$) unless otherwise indicated. The products described (salts and bases) were subjected to elementary analysis of all their elements. In all cases, the values found agreed with the formulae given.

Preparation of carboxylic acids shown in Table 1.

TABLE II

| Number of compound At Ets CLIN BYLA (CB) | In the present memorandum | R₁ | R₂ | R₃ | R₄ | X | Y | Characteristics |
|---|---|---|---|---|---|---|---|---|
| 4404 | 1 | H | H | H | H | —CH₂— | CH₂—CH₂—N(C₂H₅)(C₂H₅) | Base M.P. ĸ 86° C. (isopropylether). Hchl. M.P. ĸ 158° C. (abs. EtOH). |
| 4513 | 2 | H | H | H | H | —CH(C₂H₅)— | Same as above | {Oily base. {Neutral fumarate M.P. ĸ 155–156° C. (acetone). |
| 2842 | 3 | Cl | H | H | H | —CH₂— | do | {Base M.P. ĸ 181° C. (EtOH). {Hchl. M.P. o 172° C. (96% EtOH). |
| 4408 | 4 | Cl | H | H | H | —CH(CH₃)— | do | {Oily base. {Acid oxalate M.P. ĸ 180° C. (96% EtOH). |
| 4409 | 5 | Cl | H | H | H | —CH(C₂H₅)— | do | {Oily base. {Acid oxalate M.P. ĸ 181° C. (96% EtOH). |
| 4410 | 6 | Cl | H | H | H | —CH₂— | CH₂—CH₂—N(CH(CH₃)₂)(CH(CH₃)₂) | Base M.P. ĸ 144° C. (isopropyl ether). Hchl. M.P. ĸ 195° C. (Me OH). |
| 4411 | 7 | Cl | H | H | H | —CH₂— | CH₂—CH₂—CH₂—N(CH₃)(CH₃) | Base M.P. ĸ 125° C. (isopropyl ether). Hchl. M.P. ĸ 175° C. (abs. EtOH). |
| 4412 | 8 | Cl | H | H | H | Same | Same as above | {Base M.P. ĸ 104° C. (isopropyl ether). {Hchl. M.P. ĸ 211° C. (85% EtOH). |
| 4413 | 9 | Cl | H | H | H | do | CH₂—CH₂—N(piperidine) | {Base M.P. ĸ 148° C. (isopropylether). {Hchl. M.P. ĸ 205° C. (Me OH) |
| 4414 | 10 | Cl | H | H | H | do | CH₂—CH₂—N(morpholine) | Base M.P. ĸ 130° (benzene). Hchl. M.P. ĸ 222° C. (70% EtOH). |
| 4407 | 11 | Cl | Cl | H | H | do | CH₂—CH₂—N(C₂H₅)(C₂H₅) | Base M.P. ĸ 130° C. (EtOH). Hchl. M.P. ĸ 178° C. (MeOH). |
| 4485 | 12 | Cl | Cl | H | H | —CH(CH₃)— | Same as above | {Oily base. {Acid fumarate M.P. ĸ 155–156° C. |
| 484 | 13 | Cl | Cl | H | H | —CH(C₂H₅)— | do | {Oily base. {Acid fumarate M.P. ĸ 156° C. (abs. EtOH). |
| 4499 | 14 | Cl | Cl | H | H | —C(CH₃)₂— | do | {Base M.P. ĸ 90° C. (isopropyl ether). {Acid fumarate M.P. ĸ 156° C. (abs. EtOH). |
| 4517 | 15 | Cl | Cl | H | H | —CH—CH(CH₃)₂ | do | {Oily base. {Acid fumarate M.P. ĸ 95° C. (ethyl acetate). |
| 4497 | 16 | Cl | Cl | H | H | —CH(C₆H₅)— | do | {Base M.P. ĸ 102° C. (isopropyl ether). {Neutral fumarate M.P. ĸ 167° C. (abs. EtOH). |
| 4565 | 17 | H | H | CF₃ | H | —CH₂— | do | {Oily base. {Hchl. M.P. ĸ 148° C. (acetone). |
| 2886 | 18 | CH₃ | CH₃ | H | H | Same | do | Base M.P. ĸ 101° C. (isopropylether). |
| 2841 | 19 | H | CH₃ | H | CH₃ | do | do | {Base M.P. e 112° C. (isopropylether). {Hchl. M.P. o 173° C. (MeOH). |
| 2885 | 20 | H | H | CH₃ | CH₃ | do | do | Base M.P. ĸ 116° C. (isopropylether). |
| 4486 | 21 | Cl | CH₃ | H | H | do | do | {Base M.P. ĸ 117° C. (isopropylether). {Neutral fumarate M.P. ĸ 114–115° C. (absolute EtOH). |

PREPARATION (4-n-pentyloxy-phenoxy) acetic acid (compound D)

19 g. of powdered potassium carbonate and 13.5 g. of ethyl bromoacetate are added to a solution of 12.6 g. of 4-(n-pentyloxy)phenol in 60 ml. of acetone, and the reaction mixture is heated under reflux with stirring for 6 hours. The mineral precipitate is then separated by suction filtration, the filtrate evaporated to dryness and the residue treated with water and ether. The ethereal phase is separated, washed with a dilute soda solution and then with water, and dried over sodium sulphate. The solvent is evaporated and the residue distilled at 180 to 185° C. (temperature of water bath) under 0.1 mm. of mercury. The ethyl ester of 4-(n-pentyloxy)phenoxyacetic acid is thus obtained.

50 ml. of ethanol and a solution of 6.8 g. of potassium hydroxide in 120 ml. of water are added to 16 g. of this ester and the reaction mixture is then heated under reflux for 2 hours. When the operation is complete, the solvent is evaporated, the residue diluted with water and the aqueous solution thus formed acidified with a sufficient quantity of hydrochloric acid. 4-(n-pentyloxy)phenoxy-acetic acid precipitates in the crystalline state. It is recrystallised from diisopropyl ether, M.P.$_c$=115° C.

Acids A and G set out in Table I can be prepared by the same procedure, but to obtain compound G ethyl bromoacetate is replaced by an equimolar proportion of ethyl α-bromo-phenylacetate.

PREPARATION 2

5-(n-butoxy)phenoxy-isobutyric acid (compound C)

24 g. of powdered sodium carbonate are added to a solution of 16.6 g. of 4-n-butoxyphenol in 125 ml. of acetone whilst the reaction mixture is cooled to room temperature, and 18 g. of chloroform are then added whilst the temperature of the mixture is kept at 18 to 20° C. The addition of chloroform, which gives rise to an exothermic reaction, requires 90 minutes. When the evolution of heat has subsided, the reaction mixture is heated under reflux for 4 hours while stirring is continued. The solvent is then evaporated, the residue treated with water, the insoluble material extracted with diethyl ether, and the aqueous layer separated and acidified with hydrochloric acid, which precipitates the desired acid in the crude state. To purify this acid, it is dissolved in diethyl ether and the purified acid is extracted with a solution of potassium carbonate. The aqueous phase is separated and acidified with hydrochloric acid. The product is separated by suction filtration and recrystallised from light petroleum. M.P.$_c$=76° C.

The acids B, E, F, H and I are similarly prepared.

The acid chlorides may be prepared in particular by the action of thionyl chloride on the carboxylic acids. An example is given below.

PREPARATION 3

(4-n-butoxy-phenoxy)-isobutyric acid chloride 12 g. of (4-n-butoxy-phenoxy)-isobutyric acid in 30 ml. of benzene are heated under reflux for 2 hours with 7.2 g. of thionyl chloride. When the operation is finished, the solvent is evaporated on a water bath under the reduced pressure produced by a filter pump and the residue distilled at 145° C. (temperature of the heating bath) under 0.1 mm. of mercury.

Prepaartion of the products set out in Table II.—The reaction of the acid chlorides with the dialkylaminoalkyl para-aminobenzoates (in particular with 2-diethylaminoethyl para-aminobenzoate) is best carried out in acetone (compound 50). Other solvents, however, may also be used; thus one example is given in which benzene is used (compound 3).

EXAMPLE 1

Diethylaminoethyl 4-[(4'-cyclopentyloxy-phenoxy)-iso-butyrylamino]benzoate (compound 50 or 4636 CB)

8.6 g. of 2-diethylaminoethyl para-aminobenzoate dissolved in 40 ml. of acetone are added to a solution of 10.3 g. of (4-cyclopentyloxyphenoxy) acetyl chloride in 60 ml. of acetone. The reaction is marked by a rise in temperature which heats the solvent to near its boiling point. On cooling to room temperature, the solution deposits 11 g. of white crystals, M.P.$_c$=134° C. When recrystallised from acetone, the crystals melt at 134–135° C.; they consist of the hydrochloride of the compound.

To prepare the corresponding base, the hydrochloride is dissolved in water, and diethyl ether and a sufficient quantity of an aqueous sodium carbonate solution are added. After the ethereal solution has been separated and dried over sodium sulphate and the solvent evaporated, a white crystalline product is obtained which is easily recrystallised from diisopropyl ether. The base is thereby obtained (M.P.$_K$=104–105° C.).

EXAMPLE 2

Diethylaminoethyl 4-[(4'-chloro-phenoxy)-acetylamino]benzoate (compound 3 or 2842 CB)

5.6 g. of 2-diethylaminoethyl para-aminobenzoate dissolved in 70 ml. of benzene are added to a solution of 4.9 g. of 4-chloro-phenoxyacetyl chloride in 10 ml. of benzene. The heat evolved causes the benzene to reflux. The hydrochloride of the compound crystallises on cooling. It is recrystallised from 96% ethyl alcohol. 9.5 g. are obtained, M.P.$_c$=172° C.

The corresponding base, prepared as described in the preceding example, melts at 131° C. after crystallisation from ethanol.

All the compounds enumerated in Table II (with the exception of compound 58) are prepared by the procedure given above for compound 50. In each case, the appropriate acid chloride is used which is reacted with the 2-diethylaminoethyl para-aminobenzoate with the exception of compounds 6, 7, 8, 9, and 10 for which the 2-diethylaminoethyl ester is replaced, respectively by the para-aminobenzoates of:

2-di-isopropylaminoethanol (compound 6)
3-dimethylamino n-propanol (compound 7)
2-dimethylamino-1-methylethanol (compound 8)
2-piperidinoethanol (compound 9)
2-morpholinoethanol (compound 10)

Four additional Examples (3 to 6) are given below further to illustrate the procedure already used in Example 1.

EXAMPLE 3

Diethylaminoethyl 4-[2'-4''-chloro-phenoxy)-butyryl-amino]benzoate (compound 5 or 4409 CB)

A solution of 23 g. of 2-diethylaminoethyl para-aminobenzoate in 115 ml. of acetone are added to a solution of 22.4 g. of 2-(4'-chlorophenoxy)-butyryl chloride in 135 ml. of acetone. The reaction is exothermic. After a few minutes the reaction mixture is evaporated under reduced pressure and the residue, which consists of the hydrochloride of compound 4409 CB in the oily state, is decomposed. This is carried out as described above in Example 1. The base is obtained in the oily state; it is dissolved in acetone and treated with an equimolecular quantity of oxalic acid. 48 g. of the acid oxalate is obtained which is recrystallised from 90% ethanol.

EXAMPLE 4

Diethylaminoethyl 4-[(2',4'-dichloro-phenoxy)acetyl-amino]benzoate (compound 11 or 4407 CB)

A solution of 34.7 g. of 2-diethylaminoethyl para-aminobenzoate in 170 ml. of acetone is added to a solution of 35.3 g. of 2,4-dichlorophenol in 200 ml. of acetone. The hydrochloride of compound 4407 is formed, which is isolated by suction filtration after cooling, and it is then recrystallised from methanol (yield 61.5 g.) M.P.$_K$=178° C.

The corresponding base is prepared from the hydrochloride by the procedure described in Example 1. M.P.$_K$=130° C. (ethanol).

EXAMPLE 5

Diethylaminoethyl 4-[(4'-chloro - 2' - methoxy-phenoxy) isobutyrylamino]benzoate (compound 23 or 4553 CB)

33.5 g. of 2-diethylaminoethyl para-aminobenzoate dissolved in 170 ml. of acetone are added to a solution of 35.1 g. of (4-chloro-2-methylphenoxy)isobutyryl chloride in 200 ml. of acetone. The reaction is exothermic, but the hydrochloride of 4553 CB cannot be obtained in the crystalline state by cooling, even after concentration.

The base is prepared by the procedure described in Example 1. It is obtained in the form of an oil which is treated in solution in acetone with half the molecular quantity of fumaric acid. The neutral fumarate slowly crystallises. It is separated by suction filtration. M.P.$_K$=133° C. The fumarate is recrystallized from absolute ethanol, after which it does not change its melting point.

EXAMPLE 6

Diethylaminoethyl 4-[(4'-allyloxy-phenoxy)isobutyrylamino]benzoate (compound 41 or 4637 CB)

10.8 g. of 2-diethylaminoethyl para-aminobenzoate dissolved in 50 ml. of acetone are added to a solution of 12 g. of (4 - allyloxy - phenoxy) - isobutyryl chloride in 75 ml. of acetone. After the reaction, the solvent is evaporated and the hydrochloride is decomposed as indicated in Example 1. The base obtained in this way is then dissolved in acetone and treated with a stoichiometric quantity of fumaric acid. 22 g. of acid fumarate are formed (M.P.$_K$=142° C.) which are recrystallised from ethanol; it does not undergo any change in melting point.

Compound 58 or 4415 CB may be prepared by the special technique given below.

EXAMPLE 7

Diethylaminoethyl 4-[(4'-amino-phenoxy)acetylamino] benzoate (compound 58 or 4415 CB)

2 g. of palladium carbon (5% Pd) are added to a solution of 33.7 g. of compound 57 or 4406 CB in 300 ml. of ethanol and stirred in an atmosphere of hydrogen supplied by a gasometer under atmospheric pressure until absorption of hydrogen is complete. The theoretical absorption is obtained in 25 minutes. The catalyst is removed, the solvent evaporated, the residual oil is dissolved in diethyl ether and a sufficient quantity of a solution of gaseous hydrogen chloride in ether is added for the dihydrochloride to precipitate. The product is filtered by suction and recrystallised from ethyl alcohol (7.2 g.); the yield of dihydrochloride monohydrate is 45%. M.P.=130° C.

To obtain the base, the hydrochloride is decomposed in aqueous solution as described in Example 1. The pure base melts at 66° C. after crystallization from di-isopropyl ether.

The products set out in Table II have been subjected to various tests which are described below. They were either used in the form of salts or in the form of the base when that alone was isolated.

(1) Effect on the total fatty acid content of the liver of the white rat subjected to a protein deficient diet.

Adult male rats weighing 150 to 200 g. are fed with a low protein diet of the following composition (Tucker H., Eckstein H. C., Journal of Biological Chemistry, 1937, vol. 121, page 479).

| | G. |
|---|---|
| Casein | 5 |
| Glucose | 47.5 |
| Agar-agar | 2 |
| Lard | 40 |
| Mineral salts | 3 |
| Yeast | 2 |
| Cystein | 0.5 |

This diet produces widespread fatty degeneration of the liver within 15 days, the total fatty acid contents in some cases increasing by more than 100% compared with control rats receiving a normal diet.

One portion of the animals fed with such a diet is treated from the start of the test with one of the compounds of the invention at a daily dose of 0.5 millimols/kg. administered orally (force feeding).

On the fifteenth day of the experiment, the animals are sacrificed and the total fatty acid content of the liver is determined by the colorimetric method of Duncomb (Clinica Chimica Acta 1964, vol. 9, page 122) and after alkaline hydrolysis and extraction, by the method of Dole, Journal of Clinical Investigation 1956, vol. 35, page 150.

The results are given in values relating to the total fatty acid content of the liver of the rat.

The value obtained when the control animals receive a normal diet is taken as being equal to 0 and that obtained when rats receive the protein deficient diet without treatment is taken as +100.

The results are set out in Table IV.

(2) Effect on the metabolism of *Aspergillus niger* (Sterigmatocystis Nigra SN 315).

The effect of the products upon the general metabolism of an organism in a state of dietary excess has been studied on *Aspergillus niger* (Sterigmatocystis Nigra SN 315). This mould, cultivated in a medium very rich in carbohydrates, synthesises an increased amount of reserve lipids and starts to produce exogenic ethanol. The substances to be tested are introduced at different concentrations into the culture medium and the weights of the yields obtained are compared with those of mycelia cultivated in an identical medium without the addition.

The production of ethanol and the amount of α-keto glutaric acid and pyruvic acid accumulated in the media are also compared.

(A) Conditions of culture.—Culture medium. Each medium consists of 40 ml. of a solution containing, per litre:

| | G. |
|---|---|
| Glucose | 150 |
| Ammonium nitrate | 3 |
| Potassium chloride | 0.5 |
| Magnesium sulphate, 7H$_2$O | 0.5 |
| Monopotassium phosphate | 1.0 |
| FeSO$_4$·7H$_2$O | 0.01112 |
| ZnSO$_4$·7H$_2$O | 0.01150 |
| CuSO$_4$·5H$_2$O | 0.00125 |
| MnSO$_4$·1H$_2$O | 0.000845 |
| Ammonium molybdate·4H$_2$O | 0.000353 |

The tests are carried out by introducing the substances to be tested at four different concentrations ($10^{-3}$ M, $5 \times 10^{-4}$ M, $5 \times 10^{-5}$ M, $5 \times 10^{-6}$ M) into the media.

All the media are sterilized in an autoclave at 110° C. for 20 minutes.

Inoculationn.—The mould *A. Niger* is kept in a tube of carrot medium. The spores are collected in an intermediate medium of sterile water and the culture media are inoculated by introducing an aliquot portion of this intermediate medium.

Culture.—The culture is prepared in narrow necked 150 ml. flasks for 70 hours at 34 to 35° C.

Yield.—The media are filtered through muslin and the mycelia are washed with distilled water and then filtered by suction so that the total dry extract can be determined. The medium and the wash waters are made up to 100 ml. with distilled water, the solution thus obtained serving for the determination of the ethanol, α-ketoglutaric acid and pyruvic acid.

(B) Methods of determination.—Dry extracts.—The mycelia are finely powdered and then placed in an oven at 105° C. until the weight is constant (about 7 hours).

Ethanol.—After distillation, the ethanol is determined by oxidation by means of nitrochrome reagent.

α-Ketoglutaric and pyruvic acid.—These acids are quantitatively converted to their 2,4-dinitrophenylhydrazones and the latter separated by thin layer chromatography upon silica (development solvent: n-butanol saturated with 0.5 N ammonia). The intensity of the spots obtained from different dilutions of the media are compared with the intensity of the spots obtained with different quantities of control solutions of the dinitrophenylhydrazones of α-ketoglutaric acid and of pyruvic acid (Rf values in the region of 0.10 and 0.35 respectively).

(C) Expression of results.—All the tests are carried out in triplicate for each concentration of substance being tested. The means of the results obtained from three tests is compared with the means of the results obtained from six controls carried out in an identical manner, this means being converted in each case to 100.

The relative variations within one and the same series (the three tests or six controls) are of the order of: ±2% for the extracts, ±5% for the ethanol, ±10% for the ketonic acids. The results are set out in Table IV.

Dry extract=dry ext.; ethanol=EtOH; α-ketoglutaric acid=α-keto; pyruvic acid=pyr.

(3) Activating power on the respiration of homogenized brains of rats.—The study is carried out with compound 2842 CB or compound 3 compared with 2-diethylaminoethyl para-amino-benzoate. The technique employed is that of Warburg. The brains of white rats were ground up and diluted in Ringer's solution.

The table below indicates the results obtained expressed in percents of increase of aerobic glycolysis compared with a control period as a function of the concentration of the products in the product of homogenization of brain of rats.

TABLE III

| Molecular concentrations | $5 \times 10^{-5}$ | $5 \times 10^{-6}$ | $5 \times 10^{-7}$ |
|---|---|---|---|
| Compound: | | | |
| 2-diethylaminoethylpara-aminobenzoate | +2 | +5 | +5 |
| 2842 CB (Compound 3) | +33 | +25 | +10 |

TABLE IV

| No. | Fatty acid rat's liver | Asp. Niger | $10^{-3}$ M | $5 \times 10^{-4}$ M | $5 \times 10^{-5}$ M | $5 \times 10^{-6}$ M |
|---|---|---|---|---|---|---|
| 4404 or 1 | +108 | Dry ext | | | | |
| | | EtOH | | | | |
| | | α-keto | | | | |
| | | Pyr | | | | |
| 4513 or 2 | +44 | Dry ext | | | | |
| | | EtOH | | | | |
| | | α-keto | | | | |
| | | Pyr | | | | |
| 2842 or 3 | +43 | Dry ext | 75 | 76 | 105 | 105 |
| | | EtOH | 50 | 73 | 100 | 100 |
| | | α-keto | 170 | 420 | 85 | 40 |
| | | Pyr | 1,350 | 100 | 100 | 100 |
| 4408 or 4 | 0 | Dry ext | 54 | 62 | 100 | 100 |
| | | EtOH | 160 | 210 | 150 | 140 |
| | | α-keto | 185 | 215 | 65 | 90 |
| | | Pyr | 100 | 100 | 600 | 450 |
| 4409 or 5 | −15 | Dry ext | 60 | 66 | 100 | 103 |
| | | EtOH | 85 | 130 | 110 | 100 |
| | | α-keto | 140 | 140 | 110 | 70 |
| | | Pyr | 180 | 120 | 100 | 100 |
| 4410 or 6 | +52 | | | | | |
| 4411 or 7 | +55 | | | | | |
| 4412 or 8 | +100 | | | | | |
| 4413 or 9 | +40 | | | | | |
| 4414 or 10 | +35 | | | | | |
| 4407 or 11 | −28 | Dry ext | 47 | 68 | 92 | 100 |
| | | EtOH | 125 | 160 | 130 | 120 |
| | | α-keto | 140 | 180 | 160 | 120 |
| | | Pyr | 200 | 150 | 100 | 100 |
| 4485 or 12 | +5 | Dry ext | <1 | 42 | 100 | 105 |
| | | EtOH | 0 | 40 | 115 | 80 |
| | | α-keto | 30 | 120 | 90 | 60 |
| | | Pyr | 200 | 100 | 70 | 45 |
| 4484 or 13 | +19 | Dry ext | <1 | 60 | 95 | 104 |
| | | EtOH | 0 | 63 | 60 | 91 |
| | | α-keto | 30 | 135 | 73 | 90 |
| | | Pyr | 170 | 140 | 140 | 110 |
| 4499 or 14 | +1 | Dry ext | <1 | <1 | 100 | 100 |
| | | EtOH | 0 | 0 | 80 | 100 |
| | | α-keto | 20 | 20 | 30 | 60 |
| | | Pyr | 420 | 310 | 400 | 600 |
| 4517 or 15 | | Dry ext | 1 | 7 | 93 | 100 |
| | | EtOH | 0 | 20 | 100 | 100 |
| | | α-keto | 40 | 40 | 120 | 100 |
| | | Pyr | 100 | 100 | 100 | 100 |
| 4497 or 16 | +10 | Dry ext | 53 | 62 | 100 | 100 |
| | | EtOH | 135 | 100 | 100 | 100 |
| | | α-keto | 120 | 120 | 100 | 100 |
| | | Pyr | 250 | 170 | 140 | 170 |
| 4565 or 17 | +74 | Dry ext | 65 | 75 | 95 | 103 |
| | | EtOH | 110 | 150 | 150 | 105 |
| | | α-keto | 175 | 175 | 65 | 65 |
| | | Pyr | 100 | 100 | 50 | 0 |
| 2886 or 18 | | | | | | |
| 2841 or 19 | | | | | | |
| 2885 or 20 | | | | | | |
| 4486 or 21 | −6 | Dry ext | 80 | 85 | 100 | 100 |
| | | EtOH | 115 | 110 | 125 | 100 |
| | | α-keto | 150 | 120 | 90 | 90 |
| | | Pyr | 280 | 170 | 225 | 100 |
| 4498 or 22 | +20 | Dry ext | <0 | 45 | 100 | 100 |
| | | EtOH | 0 | 65 | 85 | 105 |
| | | α-keto | 55 | 110 | 75 | 85 |
| | | Pyr | 450 | 300 | 100 | 100 |
| 4553 or 23 | −3 | Dry ext | 5 | 58 | 98 | 102 |
| | | EtOH | 0 | 52 | 84 | 93 |
| | | α-keto | 70 | 130 | 100 | 100 |
| | | Pyr | 200 | 150 | 100 | 100 |
| 4531 or 24 | +62 | Dry ext | <1 | 26 | 94 | 97 |
| | | EtOH | 0 | 55 | 140 | 105 |
| | | α-keto | 10 | 130 | 130 | 75 |
| | | Pyr | | | | |
| 4621 or 25 | +23 | Dry ext | <1 | <1 | 97 | 100 |
| | | EtOH | 0 | 0 | 100 | 82 |
| | | α-keto | 20 | 20 | 60 | 60 |
| | | Pyr | 200 | 200 | 100 | 100 |
| 4623 or 26 | +12 | Dry ext | 43 | 50 | 97 | 103 |
| | | EtOH | 64 | 95 | 95 | 70 |
| | | α-keto | 120 | 150 | 60 | 60 |
| | | Pyr | 200 | 160 | 130 | 100 |
| 4521 or 27 | +8 | Dry ext | <1 | <1 | 92 | 100 |
| | | EtOH | 0 | 0 | 110 | 110 |
| | | α-keto | 20 | 20 | 70 | 70 |
| | | Pyr | 100 | 100 | 100 | 100 |
| 4518 or 28 | +22 | Dry ext | <1 | <1 | 85 | 98 |
| | | EtOH | 0 | 0 | 190 | 115 |
| | | α-keto | 15 | 15 | 100 | 70 |
| | | Pyr | 200 | 150 | 100 | 100 |
| 4624 or 29 | | Dry ext | <1 | <1 | 96 | 100 |
| | | EtOH | 0 | 0 | 85 | 100 |
| | | α-keto | 35 | 35 | 90 | 60 |
| | | Pyr | 160 | 160 | 100 | 65 |
| 4622 or 30 | +46 | Dry ext | <1 | <1 | 97 | 100 |
| | | EtOH | 0 | 0 | 70 | 65 |
| | | α-keto | 30 | 30 | 80 | 80 |
| | | Pyr | 200 | 200 | 130 | 100 |
| 4620 or 31 | | Dry ext | 6 | 28 | 85 | 100 |
| | | EtOH | 14 | 33 | 85 | 75 |
| | | α-keto | 65 | 40 | 120 | 120 |
| | | Pyr | 160 | 160 | 130 | 100 |
| 4512 or 32 | +90 | Dry ext | | | | |
| | | EtOH | | | | |
| | | α-keto | | | | |
| | | Pyr | | | | |
| 4405 or 33 | −1 | Dry ext | 100 | 100 | 100 | 100 |
| | | EtOH | 115 | 100 | 115 | 85 |
| | | α-keto | 200 | 170 | 85 | 85 |
| | | Pyr | 100 | 0 | 0 | 0 |

TABLE IV.—Continued

| No. | Fatty acid rat's liver | Asp. Niger | | $10^{-3}$ M | $5\times10^{-4}$ M | $5\times10^{-5}$ M | $5\times10^{-6}$ M |
|---|---|---|---|---|---|---|---|
| 4510 or 34 | +55 | Dry ext | | | | | |
| | | EtOH | | | | | |
| | | α-keto | | | | | |
| | | Pyr | | | | | |
| 4511 or 35 | +18 | Dry ext | | 85 | 92 | 105 | 100 |
| | | EtOH | | 215 | 150 | 86 | 76 |
| | | α-keto | | 210 | 170 | 130 | 1 |
| | | Pyr | | 0 | 0 | 0 | 0 |
| 4509 or 36 | +53 | Dry ext | | 87 | 95 | 106 | 103 |
| | | EtOH | | 150 | 185 | 80 | 65 |
| | | α-keto | | 210 | 160 | 115 | 115 |
| | | Pyr | | 25 | 0 | 0 | 0 |
| 4628 or 37 | +24 | Dry ext | | 56 | 81 | 100 | 100 |
| | | EtOH | | 75 | 78 | 85 | 100 |
| | | α-keto | | 100 | 100 | 100 | 75 |
| | | Pyr | | 0 | 0 | 0 | 0 |
| 4630 or 38 | +23 | Dry ext | | 0 | 23 | 87 | 100 |
| | | EtOH | | 0 | 15 | 92 | 87 |
| | | α-keto | | 0 | 65 | 50 | 50 |
| | | Pyr | | 0 | 0 | 0 | 0 |
| 4519 or 39 | +60 | Dry ext | | 98 | 98 | 104 | 102 |
| | | EtOH | | 85 | 94 | 80 | 70 |
| | | α-keto | | 120 | 100 | 80 | 40 |
| | | Pyr | | 0 | 0 | 0 | 0 |
| 4638 or 40 | −10 | Dry ext | | 84 | 84 | 96 | 110 |
| | | EtOH | | 72 | 87 | 120 | 75 |
| | | α-keto | | 130 | 130 | 90 | 90 |
| | | Pyr | | 90 | 90 | 90 | 90 |
| 4637 or 41 | −8 | Dry ext | | 80 | 94 | 92 | 100 |
| | | EtOH | | 60 | 70 | 120 | 94 |
| | | α-keto | | 55 | 55 | 90 | 90 |
| | | Pyr | | 130 | 130 | 130 | 90 |
| 4629 or 42 | +21 | Dry ext | | 83 | 93 | 104 | 95 |
| | | EtOH | | 45 | 60 | 74 | 116 |
| | | α-keto | | 70 | 50 | 50 | 50 |
| | | Pyr | | 0 | 0 | 0 | 0 |
| 4522 or 43 | +16 | Dry ext | | <1 | 49 | 98 | 100 |
| | | EtOH | | 0 | 100 | 100 | 115 |
| | | α-keto | | 50 | 160 | 100 | 100 |
| | | Pyr | | 200 | 130 | 100 | 100 |
| 4564 or 44 | +63 | Dry ext | | 0 | 35 | 84 | 100 |
| | | EtOH | | 0 | 66 | 160 | 100 |
| | | α-keto | | 0 | 70 | 70 | 70 |
| | | Pyr | | 0 | 0 | 0 | 0 |
| 4627 or 45 | +38 | Dry ext | | <1 | <1 | 100 | 100 |
| | | EtOH | | 0 | 0 | 66 | 87 |
| | | α-keto | | 25 | 25 | 44 | 64 |
| | | Pyr | | 160 | 160 | 100 | 100 |
| 4613 or 46 | | Dry ext | | <1 | <1 | 96 | 92 |
| | | EtOH | | 0 | 0 | 77 | 100 |
| | | α-keto | | 30 | 30 | 140 | 140 |
| | | Pyr | | 550 | 450 | 270 | 180 |
| 4614 or 47 | | Dry ext | | <1 | <1 | 89 | 89 |
| | | EtOH | | 0 | 0 | 73 | 120 |
| | | α-keto | | 30 | 30 | 100 | 100 |
| | | Pyr | | 450 | 350 | 270 | 180 |
| 4615 or 48 | | Dry ext | | <1 | <1 | 62 | 88 |
| | | EtOH | | 0 | 0 | 72 | 105 |
| | | α-keto | | 30 | 30 | 100 | 100 |
| | | Pyr | | 450 | 350 | 270 | 180 |
| 4636 or 50 | −12 | Dry ext | | 0 | 2 | 79 | 97 |
| | | EtOH | | 0 | 0 | 107 | 100 |
| | | α-keto | | 0 | 0 | 75 | 75 |
| | | Pyr | | 0 | 0 | 0 | 0 |
| 4639 or 53 | +8 | Dry ext | | 0 | 0 | 80 | 92 |
| | | EtOH | | 0 | 0 | 94 | 92 |
| | | α-keto | | 0 | 0 | 90 | 90 |
| | | Pyr | | 0 | 0 | 50 | 50 |
| 4526 or 54 | +141 | Dry ext | | 85 | 94 | 105 | 105 |
| | | EtOH | | 170 | 110 | 93 | 55 |
| | | α-keto | | 270 | 180 | 90 | 130 |
| | | Pyr | | 300 | 270 | 200 | 200 |
| 4571 or 55 | +51 | | | | | | |
| 4527 or 56 | +138 | Dry ext | | 91 | 95 | 98 | 103 |
| | | EtOH | | 108 | 100 | 97 | 78 |
| | | α-keto | | 180 | 180 | 90 | 90 |
| | | Pyr | | 130 | 200 | 0 | 0 |
| 4106 or 57 | +46 | Dry ext | | | | | |
| | | EtOH | | | | | |
| | | α-keto | | | | | |
| | | Pyr | | | | | |
| 4115 or 58 | +51 | Dry ext | | | | | |
| | | EtOH | | | | | |
| | | α-keto | | | | | |
| | | Pyr | | | | | |
| 4552 or 59 | +150 | Dry ext | | | | | |
| | | EtOH | | | | | |
| | | α-keto | | | | | |
| | | Pyr | | | | | |

[1] Toxic.

From the results given it will be seen that the substances described herein and in particular compounds 3, 23, 31, 48 and 50 may be used for therapeutic purposes for the treatment of pathological states relating to lipid metabolism. It may, in particular, be advantageous to use these substances in: (a) states of hyperlipemia such as familial idiopathic, alimentary hypercholesterolaemia and hypertriglyceridaemia; and (b) excess tissue lipids as in atheromatous dyslipaemia, obesity, hepatic steatosis, and tuberous and tendinous xanthomatosis.

The dosage may generally vary from 10 to 1500 mg./day, and administration may be effected by means of tablets, suppositories, preparations for local application and ampoules for drinking or injection.

We claim:

1. A compound selected from the group of para-(phenoxy-acetamido)benzoic acid esters of dialkylamino-alkanols having the formula

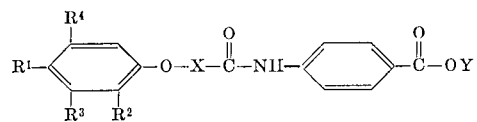

in which $R^1$ is hydrogen, chlorine, a lower alkyl, lower alkenyl, phenyl, benzyl, phenylisopropyl, hydroxyl, alkoxy having up to 6 carbon atoms, allyloxy, cyclopentyloxy, benzyloxy, acetyl, propionyl, nitro, amino or sulphamyl group, $R^2$ is hydrogen, chlorine, lower alkyl, or phenyl, $R^3$ is a hydrogen atom, a lower alkyl, trifluoromethyl of methoxy, $R^4$ is a hydrogen atom or methyl, X is a methylene group which may be substituted by one or two alkyl groups or by a phenyl group, and Y is a group having the formula

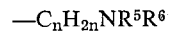

in which $n$ is 2 or 3 and each of $R^5$ and $R^6$ is a lower alkyl group or $R^5$ and $R^6$ taken together with the nitrogen atom to which they are attached form a piperidino or morpholino group, provided that when $R^1$ is chlorine and $R^2$ is a hydrogen atom the methylene group X has less than two substituents, and the pharmaceutically acceptable acid addition salts of such esters.

2. A compound selected from the group of para-(phenoxyacetamido) benzoic acid esters as claimed in claim 1 in which $R^1$ is chlorine, $R^2$, $R^3$ and $R^4$ are hydrogen, X is methylene and Y is diethylaminoethyl, and the hydrochloride thereof.

3. A compound selected from the group of para-(phenoxyacetamido)benzoic acid esters as claimed in claim 1 in which $R^1$ is chlorine, $R^2$ is methyl, $R^3$ and $R^4$ are hydrogen, X is dimethylmethylene and Y is diethylaminoethyl, and the neutral fumarate thereof.

4. The compound claimed in claim 1 in which $R^1$ is α-phenylisopropyl, $R^2$, $R^3$ and $R^4$ are hydrogen, X is dimethylmethylene and Y is diethylaminoethyl.

5. A compound selected from the group of para-(phenoxyacetamido)benzoic acid esters as claimed in claim 1 in which $R^1$ is n-pentyloxy, $R^2$, $R^3$ and $R^4$ are hydrogen, X is dimethylmethylene and Y is diethylaminoethyl, and the acid fumarate thereof.

6. A compound selected from the group of para-(phenoxyacetamido)benzoic acid esters as claimed in claim 1 in which $R^1$ is cyclopentoxy, $R^2$, $R^3$ and $R^4$ are hydrogen, X is dimethylmethylene and Y is diethylaminoethyl, and the hydrochloride thereof.

References Cited

UNITED STATES PATENTS 3,238,203  3/1966  Krapcho _____ 260—472

LORRAINE A. WEINBERGER, Primary Examiner

L. A. THAXTON, Assistant Examiner

U.S. Cl. X.R.

260—247.1, 247.2, 294.3, 470; 424—248, 267, 310